United States Patent [19]
Dvorkis et al.

[11] Patent Number: 5,923,025
[45] Date of Patent: *Jul. 13, 1999

[54] ELECTRO-MAGNETICALLY ACTIVATED SCANNER WITH SCANNER COMPONENT SUSPENDED BY SINGLE FLEXURAL COMPONENT

[75] Inventors: Paul Dvorkis, Stony Brook; Howard Shepard, Great Neck; Simon Bard; Joseph Katz, both of Stony Brook; Edward Barkan, Setauket, all of N.Y.

[73] Assignee: Symbol Technologies, Inc., Holtsville, N.Y.

[ * ] Notice: This patent is subject to a terminal disclaimer.

[21] Appl. No.: 08/911,580

[22] Filed: Aug. 14, 1997

Related U.S. Application Data

[63] Continuation of application No. 08/885,513, Jun. 30, 1997, Pat. No. 5,825,013, which is a continuation of application No. 08/589,761, Jan. 22, 1996, abandoned, which is a division of application No. 08/467,124, Jun. 6, 1995, Pat. No. 5,581,070, which is a continuation of application No. 08/108,521, Jul. 19, 1993, abandoned, which is a division of application No. 07/868,401, Apr. 14, 1992, Pat. No. 5,280,165, which is a division of application No. 07/520,464, May 8, 1990, Pat. No. 5,168,149, which is a continuation-in-part of application No. 07/428,770, Oct. 30, 1989, Pat. No. 5,099,110.

[51] Int. Cl.[6] .................................................. G06K 7/10
[52] U.S. Cl. ......................... 235/462.36; 235/462.33; 235/462.32
[58] Field of Search .................... 235/462, 472, 235/467, 470, 467.01, 462.32, 462.33, 462.36, 472.01; 359/212, 213, 214, 198, 199

[56] References Cited

U.S. PATENT DOCUMENTS

| | | | |
|---|---|---|---|
| 3,532,408 | 10/1970 | Dostal | 350/6 |
| 3,642,344 | 2/1972 | Corker | 350/6 |
| 3,981,566 | 9/1976 | Frank et al. | 350/285 |
| 4,230,393 | 10/1980 | Burke, Jr. | 350/6.5 |
| 4,578,571 | 3/1986 | Williams | 235/472 |
| 4,902,083 | 2/1990 | Wells | 350/6.6 |
| 5,245,463 | 9/1993 | Goto | 359/214 |

FOREIGN PATENT DOCUMENTS

| | | |
|---|---|---|
| 0 249 642 A1 | 12/1987 | European Pat. Off. . |
| 0 344 882 A2 | 12/1989 | European Pat. Off. . |
| 60-107017 | 6/1985 | Japan . |
| 63-34508 | 2/1988 | Japan . |
| 4-368907 | 12/1992 | Japan . |
| 6-12513 | 1/1994 | Japan . |
| 2 097 148 | 10/1982 | United Kingdom . |
| 2 175 705 | 12/1986 | United Kingdom . |
| WOI 90/01715 | 2/1990 | WIPO . |
| WO 90/08363 | 7/1990 | WIPO . |

OTHER PUBLICATIONS

Laser Beam Scanning, Opto–Mechanical Devices, Systems, and Data Storage Optics, Gerald F. Marshall, *Galvanometric and Resonant Low Inertia Scanners*, Jean Montagu, General Scanning, Inc., Watertown, Massachusetts, pp. 193–288.

*Primary Examiner*—Donald Hajec
*Assistant Examiner*—Karl Frech
*Attorney, Agent, or Firm*—Kirschstein, et al.

[57] ABSTRACT

High speed scanning arrangements in scanners for reading bar code symbols by oscillating a scanner component in a single line pattern, the scanner assembly being suspended from a single flexural assembly for oscillating movement. The flexural assembly includes a flexure that lies in a plane extending through a central region of a scan mirror in a direction orthogonal to the plane of the mirror. A drive is operative for moving the scanner assembly from a rest position in a circumferential direction to one of two scan end positions. The flexural assembly is tensioned and stores energy, which energy is released in order to return the scanner assembly in the other circumferential direction to the other scan end position.

32 Claims, 2 Drawing Sheets

ELECTRO-MAGNETICALLY ACTIVATED SCANNER WITH SCANNER COMPONENT SUSPENDED BY SINGLE FLEXURAL COMPONENT

CROSS-REFERENCE TO RELATED APPLICATIONS

This application is a continuation of U.S. Ser. No. 08/885,513, filed Jun. 30, 1997, now U.S. Pat. No. 5,825,013, which is a continuation of U.S. Ser. No. 08/589,761, filed Jan. 22, 1996, now abandoned, which is a division of U.S. Ser. No. 08/467,124, filed Jun. 6, 1995, now U.S. Pat. No. 5,581,070 which is a continuation of U.S. Ser. No. 08/108,521, filed Jul. 19, 1993 now abandoned which is a division of U.S. Ser. No. 07/868,401, filed Apr. 14, 1992, now U.S. Pat. No. 5,280,165, which is a division of U.S. Ser. No. 07/520,464, filed May 8, 1990, now U.S. Pat. No. 5,168,149, which is a continuation-in-part of U.S. Ser. No. 428,770, filed Oct. 30, 1989, now U.S. Pat. No. 5,099,110. This application is also related to pending U.S. Ser. No. 08/474,415, filed Jun. 7, 1995, which is a continuation of U.S. Ser. No. 08/108,521, filed Jul. 19, 1992, now abandoned, which is a division of U.S. Ser. No. 07/868,401, filed Apr. 14, 1992, now U.S. Pat. No. 5,280,165, which is a division of U.S. Ser. No. 07/520,464, filed May 8, 1990, now U.S. Pat. No. 5,168,149, which is a continuation in part of U.S. Ser. No. 07/428,770, filed Oct. 30, 1989, now U.S. Pat. No. 5,099,110.

BACKGROUND OF THE INVENTION

1. Field of the Invention

This invention generally relates to a scanning arrangement in a scanner operative for repetitively scanning indicia having parts of different light reflectivity, for example, bar code symbols, and, more particularly, to operating such a scanning arrangement at high speeds in single or multi-axis scan patterns.

2. Description of the Related Art

Various optical readers and optical scanners have been developed heretofore to optically read bar code symbols applied developed heretofore to optically rad bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of said patents having been assigned to the same assignee as the instant invention and being hereby incorporated herein by reference.

As disclosed in the above-identified patents and applications, a particularly advantageous embodiment of such a scanner resided, inter alia, in emitting a light beam, preferably a laser beam, emitted from a light source, preferably a gas laser or a laser diode, and in directing the laser beam to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon. A portion of the incident light reflected off the symbol was collected and detected by a detector component, e.g. a photodiode, of the scanner. The photodiode had a field of view, and the detected light over the field of view was decoded by electrical decode circuitry into data descriptive of the symbol for subsequent processing. The cyclically movable reflector swept the laser beam across the symbol and/or swept the field of view during scanning.

U.S. Pat. Nos. 4,387,297 and 4,496,831 disclose a high-speed scanning component including an electric motor operative or reciprocatingly oscillating a reflector in opposite circumferential directions relative to an output shaft of the motor. Electrical power is continuously applied to the motor during scanning. The light beam which impinges on the light reflector is rapidly swept across a symbol to be scanned in a predetermined cyclical manner. The scanning component comprises at least one scan means for sweeping the symbol along a predetermined direction (X-axis) lengthwise thereof. The scanning component may also comprise another scan means for sweeping the symbol along a transverse direction (Y-axis) which is substantially orthogonal to the predetermined direction, to thereby generate a raster-type scan pattern over the symbol. In addition to a single scan line and the raster-type pattern, other types of scan patterns are also possible, such as, x-shaped, Lissajous, curvilinear (see U.S. Pat. No. 4,871,904), etc. For example if the X and Y axis scanning motors are both driven such that the light reflectors are driven at a sinusoidally-varying rate of speed, then the scan pattern at the reference plane will be a Lissajous-type pattern for omni-directional scanning of the symbols. The use of two separate scanning motors and control means to produce the multi-axis and omni-directional scanning pattern increases material and labor costs as well as the amount of electrical power needed to operate the scanner. In addition, the relatively complicated motor shaft and bearing arrangements of the scanning components may result in a useful life that is inadequate for some applications. Furthermore, the scanning components disclosed in U.S. Pat. Nos. 4,387,297 and 4,496,831 are designed for miniature light reflectors and are not well suited for large scale reflectors.

SUMMARY OF THE INVENTION

1. Objects of the Invention

It is a general object of this invention to advance the state of the art of scanners for reading indicia of different light reflectivity, particularly laser scanners for reading bar code symbols.

An additional object of this invention is to provide novel high-speed scanning elements and novel scanning methods of operation.

Yet another object of this invention is to conveniently generate single line, multi-line or omni-directional scan patterns with the same scanning elements.

A further object of this invention is to provide a scanning arrangement having an increased scan line amplitude.

It is an other object of this invention is to minimize the number of elements comprising the scanning component.

Another object of this invention is to increase the working lifetime of the scanning components.

2. Features of the Invention

In keeping with these objects, and others which will become apparent hereinafter, this invention resides, briefly stated, in an arrangement for, and a method of, scanning indicia having parts of different light reflectivity by directing light toward the indicia and by collecting reflected light returning from the indicia. This invention comprises a scanner component supported by holder means for angular oscillating movement in a single scan direction between a pair of scan end positions or alternatively, in first and second scan directions between first and second pairs of scan end positions. According to this invention, read-start means are provided for moving the component between the scan end positions.

In one embodiment, the holder means is a planar leaf spring having opposite ends anchored and the scanner component mounted on a bent central portion of the spring. The read start means is comprised of a permanent magnet mounted to the holder and an electromagnetic coil for displacing the magnet in response to a driving signal. By energizing the nearby coil, the magnet and, in turn, the scanner component are oscillated, preferably at the resonant frequency of the component/magnet assembly.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
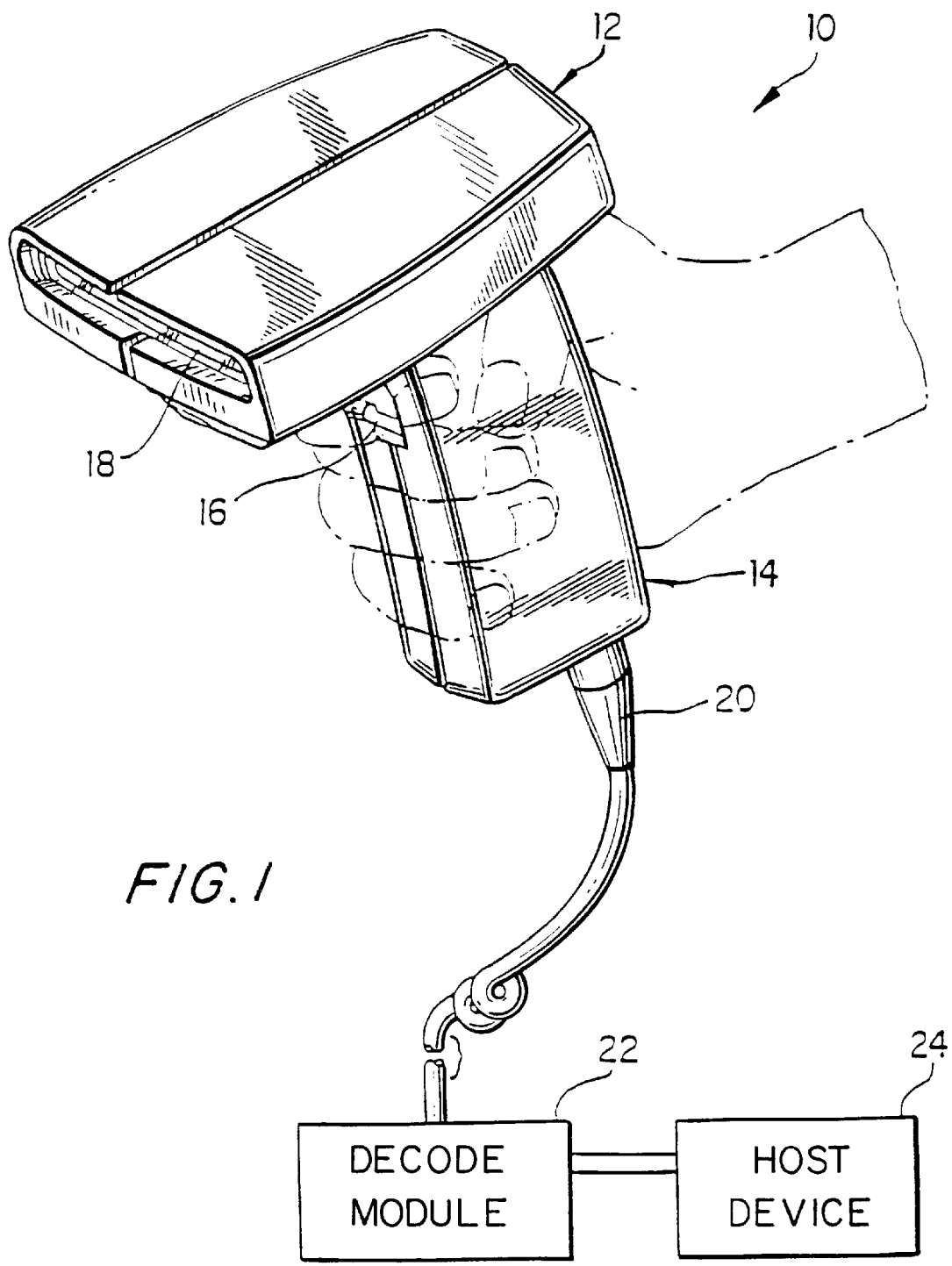
FIG. 1 is a front perspective view of hand-held head employed in a scanner.

Referring now to the drawings, as shown in FIG. 1, reference numeral 10 generally identifies a hand-held, gun-shaped scanner head having a barrel 12 and a handle 14. The head need not be gun-shaped as any suitable configuration may be used, such as box-like. A manually-operable trigger 16 is situated below the barrel 12 on an upper, forwardly-facing part of the handle 14. As known from the above-identified patents and applicants incorporated by reference herein, a light source component, typically, but not necessarily, a laser, is mounted inside the head 10. The light source emits a light beam along a transmission path which extends outwardly through a window 18 that faces indicia, e.g. bar code symbols, to be read. Also mounted within the head is a photodetector component, e.g. a photodiode, having a field of view, and operative for collecting reflected light returning through the window 14 along a return path from the symbol.

A scanner component is mounted within the head 10, and is operative or scanning the symbol and/or the field of view of the photodetector. The scanner component includes at least one light reflector positioned in the transmission path and/or the return path. The reflector is driven by an electrically-operated drive to oscillate in alternate circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 20 to a decode module 22 located exteriorly of the head 10. The decode module 22 decodes the digital signal into data descriptive of the symbol. An external host device 24, usually a computer, serves mainly as a data storage in which the data generated by the decode module 33 is stored for subsequent processing.

In operation, each time a user wishes to have a symbol read, the user aims the head at the symbol and pulls the trigger 16 to initiate reading of the symbol. The trigger 16 is an electrical switch that actuates the drive means. The symbol is repetitively scanned a plurality of times per second, e.g. 40 times per second. As soon as the symbol has been successfully decoded and read, the scanning action is automatically terminated, thereby enabling the scanner to be directed to the next symbol to be read in its respective turn.

In addition, the head need not be a portable hand hold type as fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Figure 2:
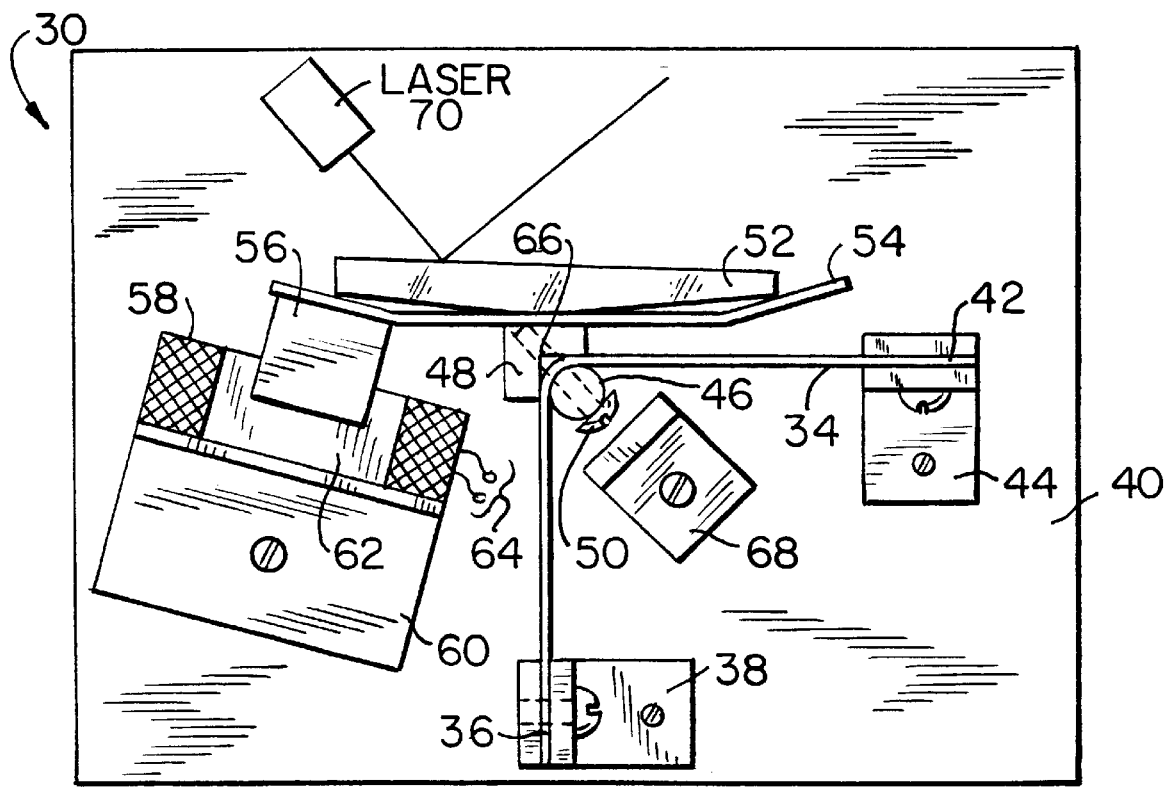
FIG. 2 is a top plan view of a further embodiment of a scanning arrangement according to this invention.

As shown in FIG. 2, one embodiment 30 of a high speed scanning arrangement of the present invention, includes a flexible beam, e.g. a generally planar leaf spring 34. Leaf spring 34 has one end 36 fixedly mounted to an upright of an L-shaped bracket 38 which is anchored to a base support 40. Spring 34 has an opposite end 42 fixedly mounted to an upright of another L-shaped bracket 44 which is anchored to the base support 40. The uprights are oriented at 90° relative to each other. A central portion of the spring 34 is guided around a cylindrical clamping pin 46. The central portion of the spring 34 is clamped between the clamping pin 46 and a bearing surface of a V-block 48 by means of a set screw 50. The clamping pin 46 imparts a 90° bend to the leaf spring at the central portion.

A scanner component, e.g. a light reflector 52, is fixedly mounted to a rear support 54 which, in turn, is fixedly secured to the V-block. The rear support 54 has a permanent magnet 56 mounted at one of its ends. An electromagnetic coil 58 is mounted adjacent the magnet 56 on an upright of another L-shaped bracket 60 which, in turn, is mounted on the base support 40. The coil 58 has a central passage 62 through which the magnet enters with clearance each time a momentary, periodic energizing pulse is applied to input loads 64. The frequency of the energizing pulse is preferably selected at the resonant frequency of $$1/2T\sqrt{k/I}$$

where K equals the spring constant of leaf spring 34, and where I equals the moment of inertia of the magnet/reflector assembly suspended from the leaf spring. The assembly is oscillated about the axis 66. The spring is advantageously constituted of plastic or metal material. Non-metal materials would be more rugged.

In operation, each time the energizing pulse is applied to the coil 58, the magnet 56 is drawn into the passage 62, thereby pulling the reflector 52, the rear support 54, the V-block 48, the clamping pin 46, the set screw 50 thereal-ong. At the same time, the leaf spring is bent. In the illustrated rest position, each arm of the leaf spring is generally planar. Upon being displaced, each arm of the leaf spring is bent, thereby storing energy therein. An L-shaped stop 68 mounted on the base support 40 is located behind the clamping pin 46 to prevent movement of the same past the step. The pin 46 does not normally engage the step, it is intended as a safety feature in the event that the arrangement is subjected to external shock forces. The flexible support near the center of rotation of the component provides an excellent shock absorber.

Once bent, the leaf spring 20 releases its stored energy, thereby displacing the magnet/reflector assembly back to and past the rest position. The entire assembly oscillates in a damped manner, until eventually coming to a halt in the rest position. Each arm of the leaf spring alternately assumes a concave and then a convex shaped during such oscillation. Light directed from a source, e.g. a laser 70, onto the reflector 52 is swept in one direction in a scan across indicia to be read. Another embodiment of the same configuration utilizes constant amplitude excitation, with continuous oscillation. In this embodiment, the driving signal is a continuously applied AC signal that causes the magnet 56 to be cyclically drawn into the passage 62 and forced out of the passage 62. The spring 34 vibrates to oscillate the reflector 40 between scan end position.

By providing a well defined center of rotation at axis 66 that is close to the scan component, image translation is minimized. In addition, in this configuration the scan pattern stays centered regardless of the scan position.

It will be understood that each of the elements described above, or two or more together, also may find a useful application in other types of constructions differing from the types described above.

While the invention has been illustrated and described as embodied in a power-saving scanning arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In an apparatus for reading bar code symbols by scanning a light beam directed toward the symbols in a scan plane located exteriorly of the apparatus, and by collecting reflected light returning from the symbols, an arrangement comprising:

a) a support;
    b) a scanner assembly;
    c) a flexural assembly for supportably mounting the scanner assembly for oscillating movement generally about an axis, said flexural assembly including a single, unitary, flexural component having one portion forming a first flexural and another portion forming a second flexure, said flexural assembly being operatively connected to the support and to the scanner assembly; and
    d) an electro-magnetic drive for imparting a force to the scanner assembly, thereby resulting in movement of the scanner assembly in an oscillating manner, and thereby causing the light beam directed toward the symbols to scan over the symbols in a one-dimensional linear scan pattern between scan end positions in the scan plane.

2. The arrangement according to claim 1, wherein the scanner assembly includes a light reflector.

3. The arrangement according to claim 1, wherein the scanner assembly includes an optical component for directing the laser light beam.

4. The arrangement according to claim 3, wherein the optical component is a mirror.

5. The arrangement according to claim 1, further comprising a semiconductor laser diode for generating the light beam.

6. The arrangement according to claim 5, wherein the laser diode is mounted on the support.

7. The arrangement according to claim 1, wherein each flexure is generally planar.

8. The arrangement according to claim 1, wherein the flexures are constituted of a flexible, resilient material.

9. The arrangement according to claim 1, wherein the flexures are constituted of a metallic material.

10. The arrangement according to claim 1, wherein the flexures are constituted of a plastic material.

11. The arrangement according to claim 1, wherein each flexures is a leaf spring.

12. The arrangement according to claim 1, wherein the scanner assembly is suspendably mounted by the flexures.

13. The arrangement according to claim 1, wherein the drive imparts the force solely in one direction, thereby resulting in the scanner assembly being moved along a limited arcuate path about said axis.

14. The arrangement according to claim 1, wherein the drive includes an energizable electromagnetic drive coil member and a drive magnet member, and wherein one of said drive members in mounted on the support, and wherein the other of said drive members is operatively connected to the scanner assembly.

15. The arrangement according to claim 14, wherein said one drive member is the electromagnetic coil member having a passage, and wherein said other drive member is the magnet member movable generally in the direction of the passage during energization of the coil.

16. The arrangement according to claim 14, wherein the scanner assembly includes a scan component and an elongated supporting component for supporting the scan component, and wherein the coil and magnet members are located at an end region of the elongated supporting component.

17. The arrangement according to claim 14, wherein the coil member is energized by an energizing pulse having a frequency selected to be the same as a resonant frequency of the scanner and flexural assemblies.

18. The arrangement according to claim 1, wherein the drive is operative for imparting a drive force to the scanner assembly over a period of time less than that required for the scanner assembly to reach one of said scan end positions.

19. The arrangement according to claim 18, wherein the flexures flex and exert a return force on the scanner assembly, said return force acting opposite to said drive force.

20. The arrangement according to claim 1, wherein the drive is operative for imparting a force to the scanner assembly for producing a reciprocally oscillating movement.

21. The arrangement according to claim 1, wherein the first and second flexures have longitudinal edges that lie in respective border planes extending generally orthogonally relative to said axis.

22. The arrangement according to claim 21, wherein the border planes are parallel to each other.

23. The arrangement according to claim 22, wherein the border planes are coincident.

24. The arrangement according to claim 1, wherein the first and second flexures have ends that are fixed to the support.

25. The arrangement according to claim 1, wherein the oscillating movement of the scanner assembly generally occurs in a plane orthogonal to said axis.

26. In an apparatus for reading bar code symbols by scanning a single laser light beam directed towards the symbols in a scan plane located exteriorly of the apparatus, and by collecting reflected laser light returning from the symbols, an arrangement comprising:
   a) a support;
   b) a semiconductor laser diode for generating the laser light beam;
   c) a generally planar scan mirror having a central region;
   d) a holder for the scan mirror;
   e) a single, unitary, flexural component including at least first and second flexure portions operatively connected to the support and the holder, and operative or supportably mounting the scan mirror and the holder for oscillating movement relative to the support generally about an axis, at least one of said flexure portions lying in a plane extending through the central region of the scan mirror and extending generally orthogonal to the plane of the scan mirror; and
   f) an electro-magnetic drive located at one side of the flexural component for imparting a force to the scan mirror, thereby resulting in movement of the scan mirror and the holder in an oscillating manner, and thereby causing the laser light beam directed toward the symbols to scan over the symbols in a one-dimensional linear scan pattern between scan end positions in the scan plane.

27. In an apparatus for reading bar code symbols by scanning a light beam directed toward the symbols in a scan plane located exteriorly of the apparatus, and by collecting reflected light returning from the symbols, an arrangement comprising:
   a) a support;
   b) a scanner assembly;
   c) a single, unitary, flexural component including at least first and second generally planar flexure portions operatively connected to the support and the scanner assembly, and operative for supportably mounting the scanner assembly for oscillating movement generally about an axis that lies in the planes of the first and second flexure portions; and
   d) an electro-magnetic drive for imparting a force to the scanner assembly, thereby resulting in movement of the scanner assembly in an oscillating manner, and thereby causing the light beam directed toward the symbols to scan over the symbols in a one-dimensional linear scan pattern between scan end positions in the scan plane.

28. In an apparatus for reading bar code symbols by scanning a light beam directed toward the symbols in a scan plane located exteriorly of the apparatus, and by collecting reflected light returning from the symbols, an arrangement including:
   a) a support;
   b) a scanner assembly;
   c) a single, unitary, flexural component including at least first and second generally planar flexure portions operatively connected to the support and the scanner assembly, and operative for supportably mounting the scanner assembly for oscillating movement generally about an axis that lies in the planes of the first and second flexure portions, said flexural component being elongated and having a length dimension, as considered lengthwise along a longitudinal direction, and a width dimension, as considered along a transverse direction generally orthogonal to the longitudinal direction, said length dimension being greater than said width dimension, and
   d) an electro-magnetic drive for imparting a force to the scanner assembly, thereby resulting in movement of the scanner assembly in an oscillating manner, and thereby causing the light beam directed toward the symbols to scan over the symbols in a one-dimensional linear scan pattern between scan end positions in the scan plane.

29. In an apparatus for reading bar code symbols by scanning a single laser light beam directed toward the symbols in a scan plane located exteriorly of the apparatus, and by collecting reflected light returning from the symbols, an arrangement comprising:
   a) a support;
   b) a semiconductor laser diode for generating the laser light beam;
   c) a generally planar scan mirror;
   d) a holder for the scan mirror;
   e) a single, unitary, flexural component including at least first and second flexure portions operatively connected to the support and the holder, and operative for supportably mounting the scan mirror and the holder for reciprocally oscillating movement relative to the support generally about an axis, at least one of said flexure portions lying in plane generally orthogonal to the plane of the scan mirror; and
   f) an electro-magnetic drive located at one side of the flexural component for imparting a force to the scan mirror, thereby resulting in movement of the scan mirror and the holder in an oscillating manner, and thereby causing the laser light beam directed toward the symbols to scan over the symbols in one-dimensional linear scan pattern between scan end positions in the scan plane.

30. An arrangement in an apparatus for reading bar code symbols, comprising:
   a) a support having a generally planar support region;
   b) a semiconductor laser diode on the support for generating a laser light beam;
   c) a generally planar scan mirror for reflecting the light beam toward bar code symbols located exteriorly of the apparatus;
   d) a holder for holding the scan mirror;
   e) a single, unitary, flexural component having generally planar, flexure portions operatively connected to the support and to the holder, and operative for supportably and suspendably mounting the scan mirror and the holder for reciprocally oscillating movement generally about an axis extending generally orthogonal to the support region, at least one of the flexure portions lying in a plane generally orthogonal to the scan mirror; and
   f) a drive including an electro-magnetic coil and a permanent magnet, for imparting a force to the holder, thereby resulting in movement of the scan mirror and the holder in an oscillating manner, and in flexing of the flexural component, and thereby causing the light beam reflected off the scan mirror to sweep over the symbols.

31. The arrangement according to claim 30, where said at least one flexure portion has an end fixedly connected to the support region at a first support area, and wherein the other of the flexure portions has an end fixedly connected to the support region at a second support area spaced from the first support area.

32. The arrangement according to claim 30, wherein the magnet is mounted on the holder, and wherein the coil is mounted on the support region and has an interior passage in which the magnet is at least partially received during the oscillating movement.

* * * * *